US008870393B2

(12) United States Patent
Kawahara

(10) Patent No.: US 8,870,393 B2
(45) Date of Patent: Oct. 28, 2014

(54) IMAGE PROJECTION APPARATUS AND METHOD OF CONTROLLING THE SAME INCLUDING DETERMINING A CORRECTION TABLE FOR CORRECTING RGB VALUES OF IMAGE DATA

(75) Inventor: Norihiro Kawahara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 618 days.

(21) Appl. No.: 12/818,567

(22) Filed: Jun. 18, 2010

(65) Prior Publication Data
US 2011/0001881 A1 Jan. 6, 2011

(30) Foreign Application Priority Data

Jul. 1, 2009 (JP) .................. 2009-157313

(51) Int. Cl.
*H04N 9/31* (2006.01)
*H04N 17/04* (2006.01)
*H04N 9/73* (2006.01)

(52) U.S. Cl.
CPC ........... *H04N 17/045* (2013.01); *H04N 9/3197* (2013.01); *H04N 9/73* (2013.01); *H04N 9/3182* (2013.01); *H04N 9/3191* (2013.01); *H04N 9/3194* (2013.01)
USPC ............. 353/122; 353/85; 345/589; 345/591; 345/617

(58) Field of Classification Search
CPC ............ H04N 9/31821; H04N 9/3191; H04N 9/3194; H04N 9/3197; H04N 9/73; H04N 17/045
USPC ........ 353/69, 70, 121, 122, 85; 345/589, 591, 345/617

See application file for complete search history.

(56) References Cited

U.S. PATENT DOCUMENTS

| | | | |
|---|---|---|---|
| 6,899,431 B2 * | 5/2005 | Wada ............................. 353/31 |
| 7,036,940 B2 * | 5/2006 | Matsuda et al. ................ 353/70 |
| 7,114,813 B2 * | 10/2006 | Wada et al. ..................... 353/70 |
| 7,221,792 B2 * | 5/2007 | Matsuda et al. ............. 382/167 |
| 7,266,240 B2 * | 9/2007 | Matsuda ....................... 382/167 |
| 7,314,283 B2 | 1/2008 | Tsukada |
| 7,403,318 B2 * | 7/2008 | Miyazawa et al. ............ 359/242 |
| 7,422,331 B2 * | 9/2008 | Matsuda ........................ 353/69 |
| 7,949,202 B2 * | 5/2011 | Matsuda ....................... 382/275 |
| 7,969,450 B2 * | 6/2011 | Zhou ............................. 345/589 |
| 2003/0193566 A1 * | 10/2003 | Matsuda et al. ............. 348/189 |
| 2003/0234785 A1 * | 12/2003 | Matsuda et al. ............. 345/426 |
| 2004/0140981 A1 * | 7/2004 | Clark ............................ 345/600 |
| 2004/0156024 A1 * | 8/2004 | Matsuda et al. ................ 353/70 |
| 2004/0212783 A1 * | 10/2004 | Wada ............................. 353/31 |
| 2004/0227908 A1 * | 11/2004 | Wada et al. ..................... 353/94 |
| 2006/0152529 A1 * | 7/2006 | Matsuda ....................... 345/604 |
| 2006/0181686 A1 * | 8/2006 | Matsuda ........................ 353/69 |
| 2006/0181687 A1 * | 8/2006 | Matsuda ........................ 353/69 |
| 2007/0132893 A1 * | 6/2007 | Miyazawa et al. ............ 348/745 |

* cited by examiner

*Primary Examiner* — Francis M Legasse, Jr.
*Assistant Examiner* — Bao-Luan Le
(74) *Attorney, Agent, or Firm* — Cowan, Liebowitz & Latman, P.C.

(57) ABSTRACT

An image projection apparatus that can perform a wall color correction and an ambient light correction obtains a wall color correction parameter by projecting a calibration image for the wall color correction and then obtains an ambient light correction parameter by projecting a calibration image for the ambient light correction, which has been subjected to the wall color correction using the wall color correction parameter.

13 Claims, 9 Drawing Sheets

IMAGE PROJECTION APPARATUS AND METHOD OF CONTROLLING THE SAME INCLUDING DETERMINING A CORRECTION TABLE FOR CORRECTING RGB VALUES OF IMAGE DATA

BACKGROUND OF THE INVENTION

1. Field of the Invention

The present invention relates to an image projection apparatus and a method of controlling the same.

2. Description of the Related Art

Recently, liquid crystal projectors that can simply and easily display a large screen by projection have come to be used widely in making presentations in meetings or displaying movie content at home. The liquid crystal projectors are used in various lighting environments, and it is desirable to carry out color reproduction according to actual lighting in projection environments. On the other hand, CIECAM02 (CAM: Color Appearance Model), which is a chromatic adaptation model, published by CIE and other models have been developed for color matching technology. Using these techniques and taking into consideration the lighting environments and the like of liquid crystal projectors, color reproduction is becoming a possibility.

To apply color reproduction to a liquid crystal projector by taking such visual adaptation into consideration, it is necessary to acquire information about illuminating light (ambient light) as viewing environment information. Existing techniques for measuring such illuminating light includes, for example, spectroscopic instruments that use diffracting gratings and color sensors which use color filters or the like. Furthermore, it is necessary to install an integrating sphere or diffuser on the front of the sensors in order to sense the illuminating light properly.

Such equipment, if used, will allow the illuminating light to be measured accurately, but is not desirable from the viewpoint of product costs. If the liquid crystal projector is equipped with a screen color measurement sensor (color sensor) for automatic screen color correction, desirably the illuminating light is sensed using the color sensor. Examples of measuring illuminating light using a color sensor includes a technique, described in U.S. Pat. No. 7,314,283, for projecting one or more calibration images and acquiring color information about the one or more calibration images using the color sensor. The technique performs color conversion in such a way as to match appearances of colors based on color information about an input image and color information about the projected image on a projection plane, thereby changes colors of the input image, and consequently obtains colors for use to output to the projector.

The method described in U.S. Pat. No. 7,314,283 measures the calibration image in advance and thereby obtains color conversion characteristics which realize both color correction on the projection plane and correction for the influence of ambient environment light. However, complicated computations are required in order to generate a 3D-LUT which realizes both color correction on the projection plane and correction for the influence of ambient environment light at the same time. Furthermore, if ambient illuminating light (ambient light) changes during projection, it becomes necessary to regenerate the 3D-LUT which realizes both color correction on the projection plane and correction for the influence of ambient environment light at the same time. This makes it necessary to carry out complicated computations again.

SUMMARY OF THE INVENTION

An aspect of the present invention is to eliminate the above-mentioned problems with the conventional technology.

It is a feature of the present invention to provide an image projection apparatus and a method of controlling the same which can accurately and quickly generate color correction information for use to correct for the influence of ambient environment light even when a projection plane is colored.

According to an aspect of the present invention, there is provided an image projection apparatus comprising:

an image projection unit configured to project an image on a projection plane based on image data;

a sensor configured to sense a color on the projection plane; and a controller configured to control the image projection unit and the sensor and to correct the image data;

wherein the controller makes the image projection unit project a first image for a wall color correction, makes the sensor sense color on the projection plane during projecting the first image, and obtains first correction information based on the sensed color on the projection plane during projecting the first image, wherein the controller makes the image projection unit project a second image based on image data obtained by correcting the first image for an ambient light correction based on the first correction information, makes the sensor sense color on the projection plane during the projecting the second image, and obtains second correction information according to the sensed color on the projection plane during the projecting the second image, and wherein the controller corrects the image data based on the first and second correction information and causes the image projection unit to project an image based on the corrected image data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
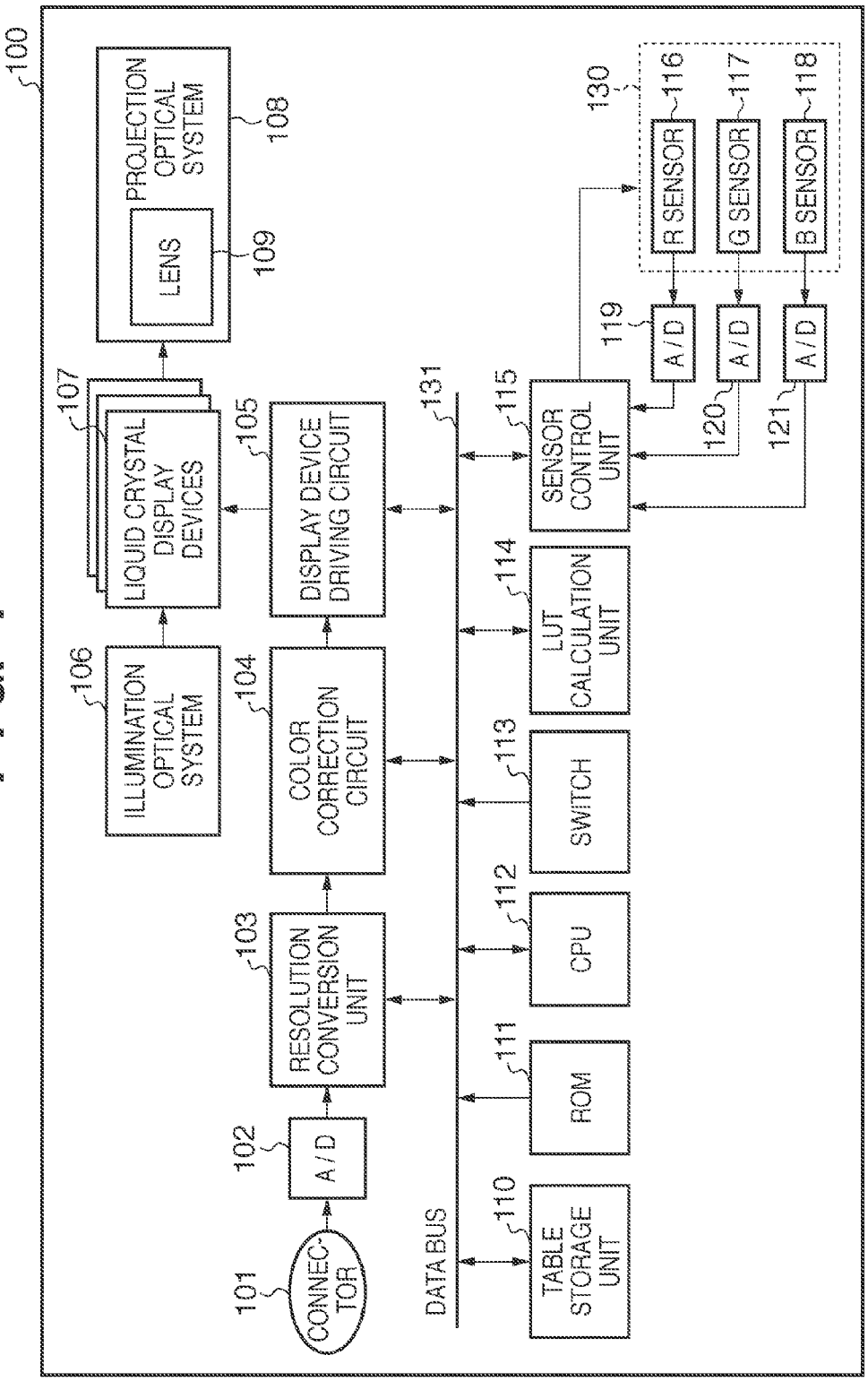
FIG. 1 is a block diagram describing a main configuration of an image projection apparatus according to an embodiment of the present invention.

FIG. 1 is a block diagram describing a main configuration of an image projection apparatus 100 according to an embodiment of the present invention.

The image projection apparatus 100, which is a projection display apparatus adapted to display an image using a projector, receives a video signal from an image supply device (not shown) such as a personal computer, DVD player, or TV tuner via a connector 101. The video signal is converted into a digital signal by an A/D converter 102. However, if a digital video signal is received from the image supply device (not shown), the A/D conversion by an A/D converter 102 is unnecessary. A resolution conversion unit 103 converts the video signal into a video signal having resolution suitable for red, green, and blue liquid crystal display devices 107. A color correction circuit 104 applies color correction to the video signal whose resolution has been converted by the resolution conversion unit 103. A display device driving circuit 105 performs double-speed conversion, VT gamma correction, and the like needed to drive the liquid crystal display devices 107, on the video signal subjected to color correction, and thereby generates drive signals for the liquid crystal display devices 107. The liquid crystal display devices 107 receive a luminous flux emitted from an illumination optical system 106 and transmit the luminous flux to a projection optical system 108 under the control of the drive signals from the display device driving circuit 105. The projection optical system 108 performs a zoom operation using a lens 109 and projects the luminous fluxes from each of the liquid crystal display devices 107 onto a screen 201 (FIG. 2) as projection light.

Figure 8A:
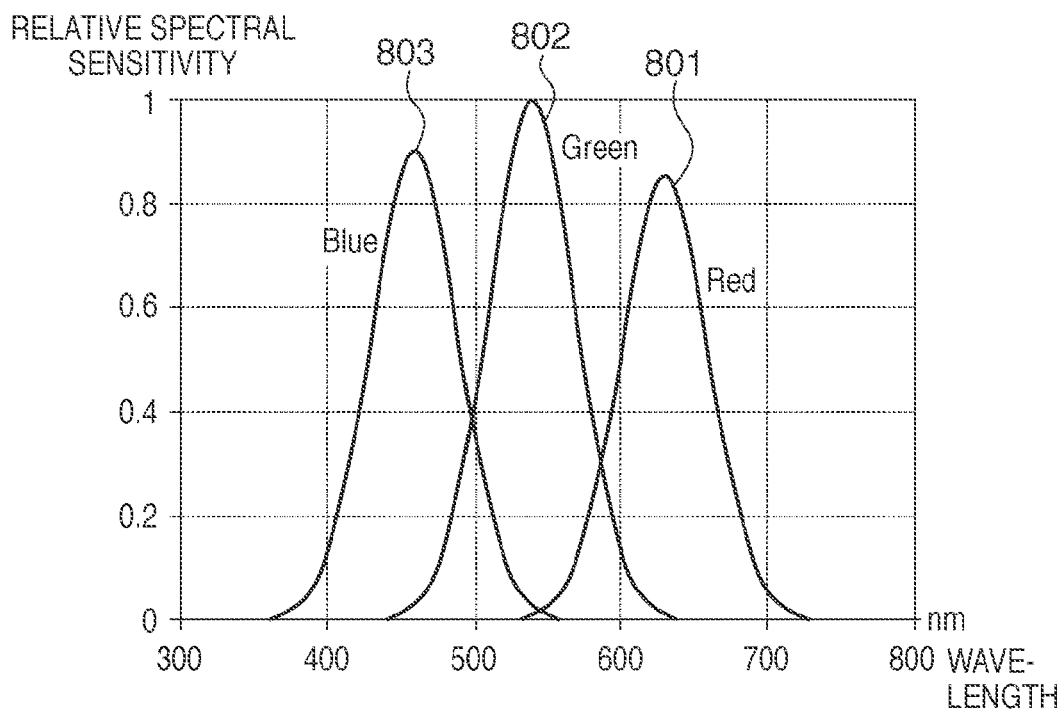
FIG. 8A is a diagram describing relative spectral sensitivity of sensors.

A table storage unit 110 implemented by a RAM or the like stores a three-dimensional lookup table (3D-LUT) for ambient light correction created by a lookup table calculation unit (LUT calculation unit) 114. A ROM 111 prestores programs executed by a central processing unit (CPU) 112, data on the ideal white for the screen 201, and the like. When a user operates a switch 113, switching information is sent to the CPU 112 via a data bus 131. The LUT calculation unit 114 performs calculations to generate a 3D-LUT for color correction through operations described later in response to color sensed results produced by a sensor unit 130 by sensing colors on the projection plane. The sensor unit 130 includes a red (R) sensor 116, green (G) sensor 117, and blue (B) sensor 118 each of which has relative spectral sensitivity as shown in FIG. 8A. The CPU 112 executes the programs stored in the ROM 111 by loading the programs into a RAM (not shown) or the like, and thereby controls individual blocks of the image projection apparatus 100.

FIG. 8A is a diagram describing relative spectral sensitivity of each sensor.

In FIG. 8A, sensor sensitivities are normalized by taking maximum sensitivity of the G sensor 117 as "1" and the relative spectral sensitivities of the R sensor 116, G sensor 117, and B sensor 118 are designated by 801, 802, and 803, respectively.

Figure 8B:
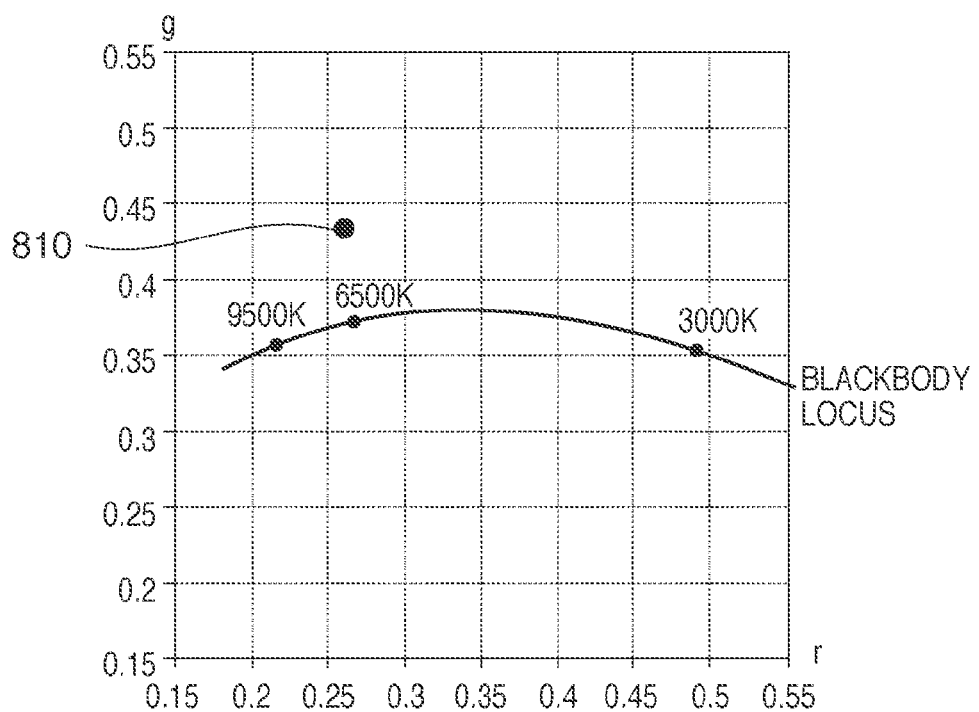
FIG. 8B is an rg chromaticity diagram describing a blackbody locus based on sensitivities of each sensor.

FIG. 8B is an rg chromaticity diagram describing a blackbody locus based on the sensitivity of each sensor.

Data sensed (measured) by the R sensor 116, G sensor 117, and B sensor 118 are converted into digital signals by A/D converters 119, 120, and 121, respectively, and sent to a sensor control unit 115. The sensor control unit 115 receives output data from the A/D converters 119, 120, and 121 and converts the output data into a format suitable for processing by the CPU 112. Also, the sensor control unit 115 drives the sensor unit 130 on instructions from the CPU 112.

Figure 2:
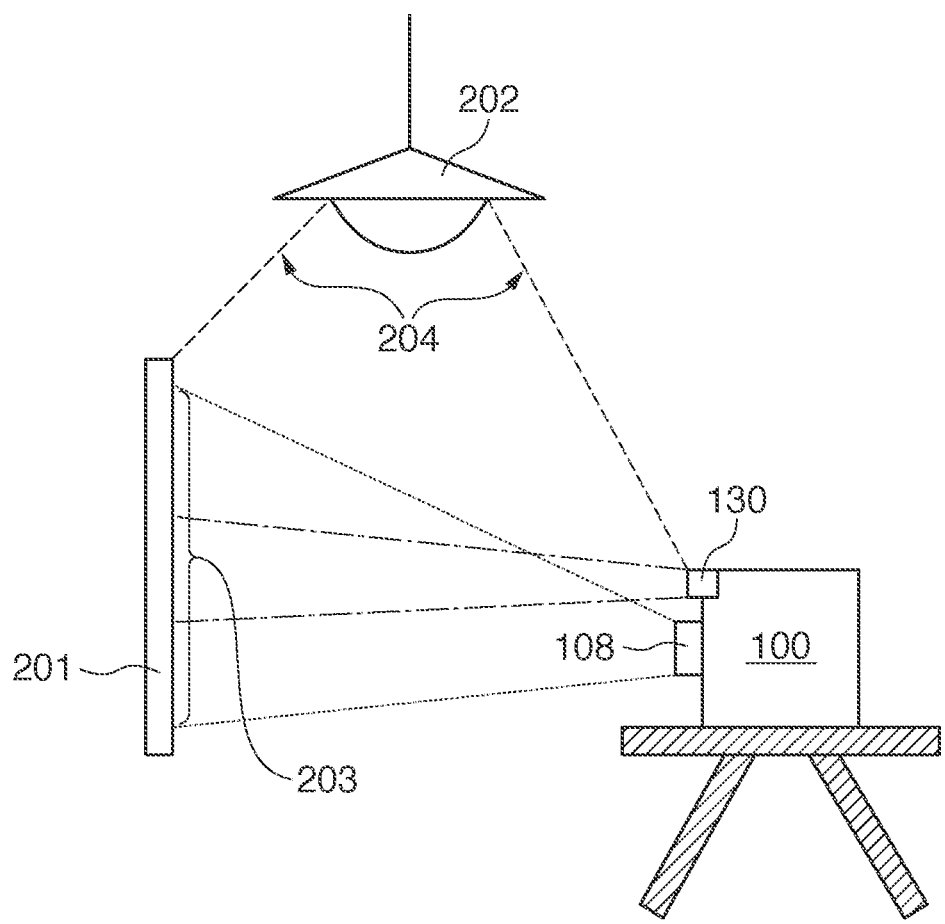
FIG. 2 is a diagram showing an application example of the image projection apparatus according to the present embodiment.

FIG. 2 is a diagram describing an application example of the image projection apparatus according to the present embodiment.

The image projection apparatus 100 configured as shown in FIG. 1 projects an image from the projection optical system 108 onto the screen 201 to produce a projected image 203. At this time the projected image 203 is affected by the color of the screen 201 and illuminating light 204 emitted from a lighting apparatus 202. For example, even when a white image is displayed, the image is colored or changes brightness depending on the type of screen 201. Color reproduction also varies with the color temperature and type of the illuminating light 204. The sensor unit 130 detects the brightness and colors of the image on the screen 201 to achieve wall color correction and ambient light correction, where the wall color correction is correction of color appearance for the color of the screen 201 while ambient light correction is the correction for color changes caused by the illuminating light 204.

Figure 3:
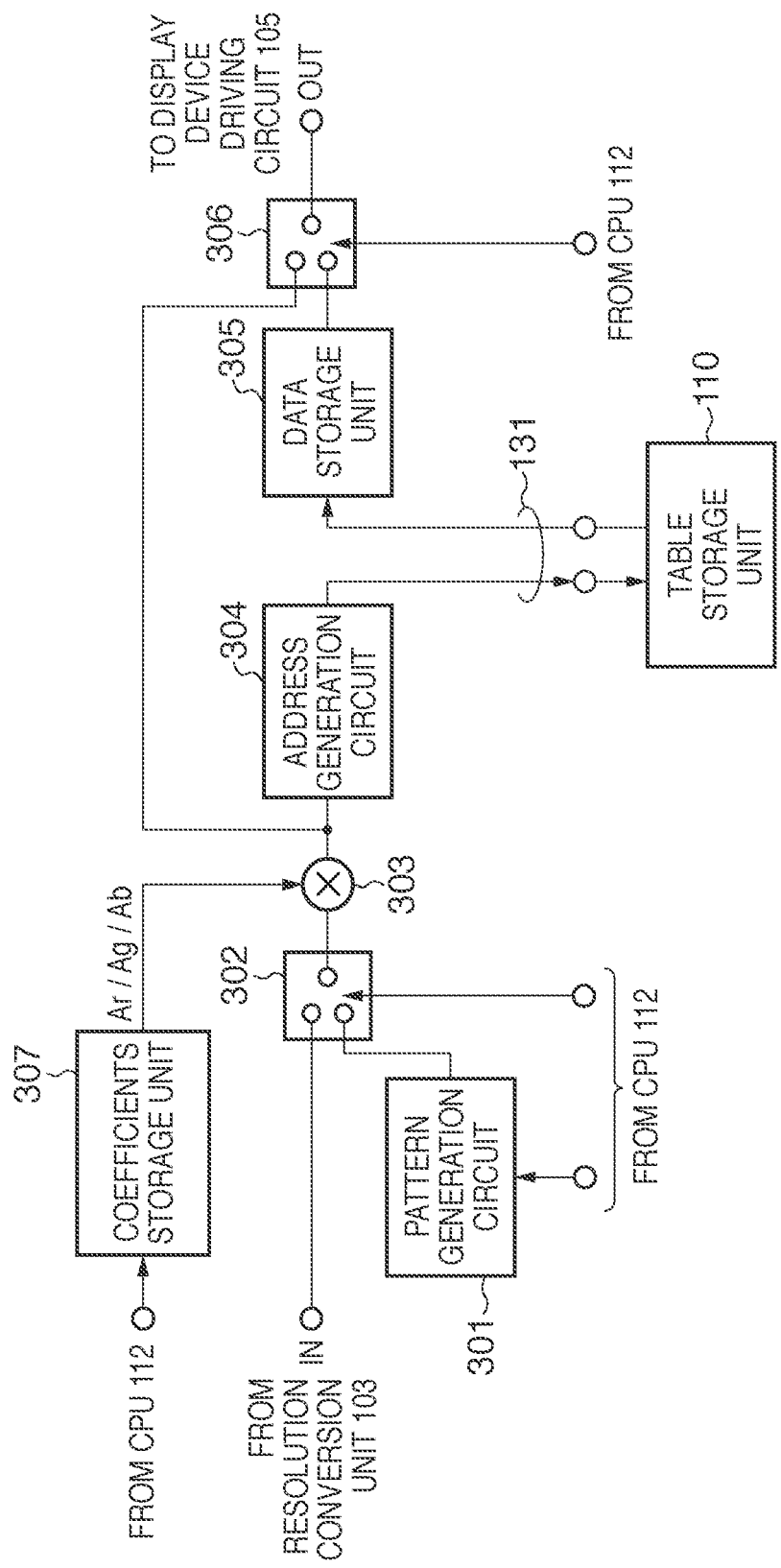
FIG. 3 is a block diagram describing a configuration of a color correction circuit according to a first embodiment.

FIG. 3 is a block diagram describing a configuration of the color correction circuit 104 according to a first embodiment.

Output of the resolution conversion unit 103 is inputted in a selector 302. Output of a pattern generation circuit 301 which generates a calibration pattern for use to sense the color of the projection plane is also inputted in the selector 302. On instructions from the CPU 112, the selector 302 selects the output of the pattern generation circuit 301 when outputting a calibration pattern for use to sense the color of the screen 201. On the other hand, when a normal image is projected, the selector 302 selects the output of the resolution conversion unit 103. A coefficients storage unit 307 stores red gain (Ar), green gain (Ag), and blue gain (Ab) determined by undermentioned operations and received from the CPU 112. A multiplier 303 multiplies output of the selector 302 by output of the coefficients storage unit 307 and thereby adjusts the gains. Incidentally, although only a single signal line is shown as joining each pair of components in FIG. 3, this is for the sake of convenience, and actually three signal lines may be used for R, G, and B or a single signal line may be used by time-division multiplexing the R, G, and B. Output of the multiplier 303 is sent to a selector 306 and an address generation circuit 304. The address generation circuit 304 converts an output signal of the multiplier 303 into an address in the table storage unit 110 and sends the address to the table storage unit 110 via the data bus 131. The table storage unit 110 reads table data written in the address received from the address generation circuit 304 and sends the table data to a data storage unit 305 via the data bus 131. The data storage unit 305 extracts a signal value from the data received from the table storage unit 110 and sends the signal value to the selector 306, where the signal value corresponds to a value obtained by applying predetermined correction to the output signal of the multiplier 303. On instructions from the CPU 112, the selector 306 selects the output of the data storage unit 305 when ambient light correction is performed using the 3D-LUT, and selects the output signal of the multiplier 303 when ambient light correction is not performed.

Figure 4:
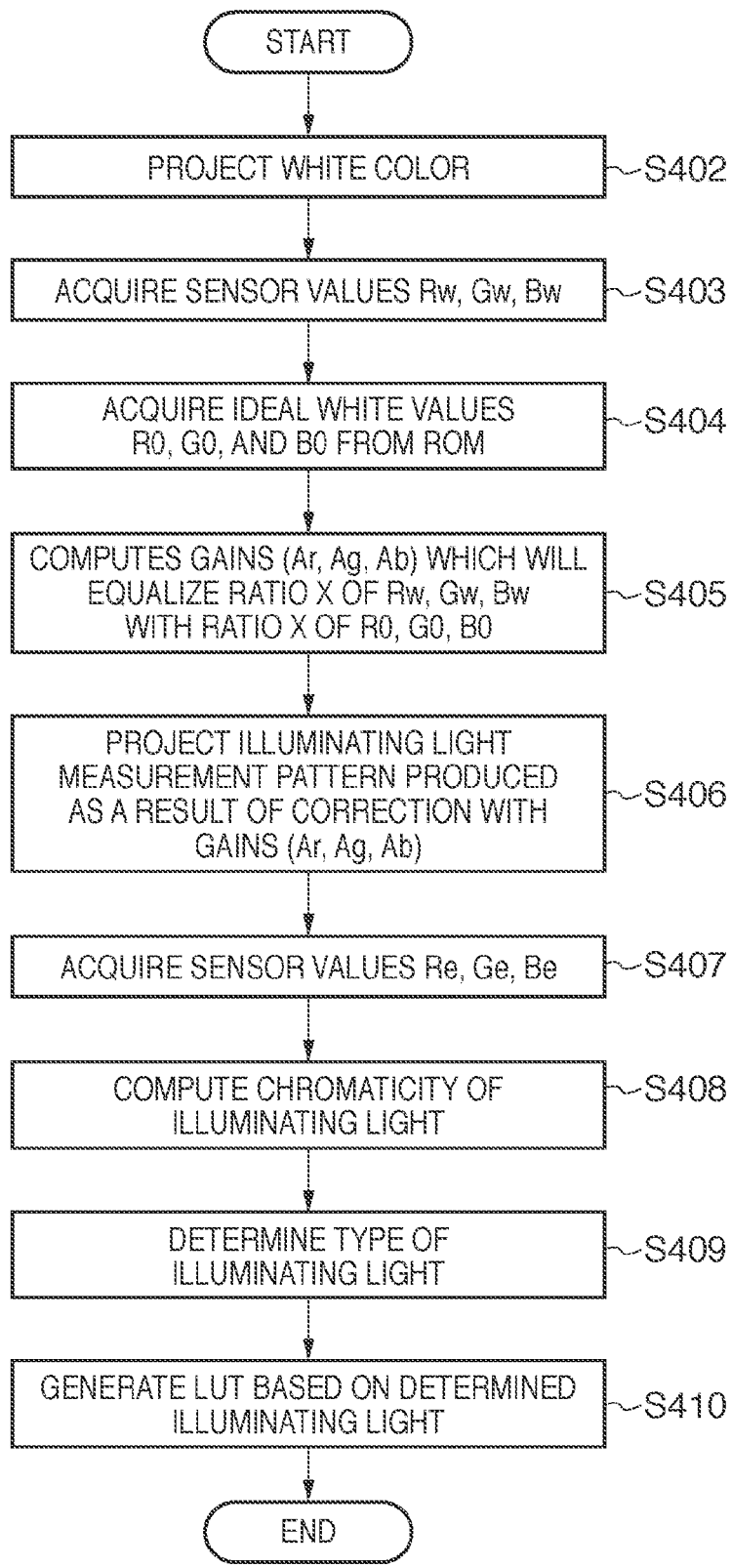
FIG. 4 is a flowchart describing operation of the image projection apparatus according to the first embodiment.

FIG. 4 is a flowchart describing operation of the image projection apparatus according to the first embodiment of the present invention. A program which performs this process is stored in the ROM 111, and executed under the control of the CPU 112.

The process described in the flowchart is started when power is turned on or the switch 113 is operated. First in step S402, the image projection apparatus 100 generates all-white image data (a first image) using the pattern generation circuit 301 and projects the white color image onto the screen 201. The white color image is projected for two reasons described below. The first reason is that even if the screen 201 is colored, by projecting white color image and correcting to display a white color image on the screen 201, it is possible to eliminate the effect of coloring of the screen 201 and obtain correct white color on the screen 201. The second reason is that when bright light such as white is projected, light reflected by the screen 201 is affected greatly by a light source in the illumination optical system 106, reducing the effect of the illuminating light 204 from the lighting apparatus 202 and thereby making it possible to perform wall color correction without being affected by the illuminating light 204 (ambient light). Although all-white image data is generated in the example described above, another color may be used partially, and it is not strictly necessary to use a completely white color.

At this point, a 3D-LUT for ambient light correction has not been created yet, and thus no 3D-LUT is used. Therefore, the selector 306 selects the output signal of the multiplier 303. Next, in step S403, the image projection apparatus 100 acquires color data Rw, Gw, and Bw of the screen 201 produced by projection of white color, from the R sensor 116, G sensor 117, and B sensor 118, respectively. Next, in step S404, the image projection apparatus 100 acquires first color data R0, G0, and B0 from the ROM 111, where the first color data R0, G0, and B0 represents ideal white value stored in the ROM 111. Next, in step S405, the image projection apparatus 100 computes gains Ar, Ag, and Ab which will equalize a ratio of Rw, Gw, and Bw of second color data acquired from the sensor unit 130 with a ratio of R0, G0, and B0 of the ideal white value acquired in step S404. In the example described above, the gains Ar, Ag, and Ab are computed as correction information through calculation of first color correction, that is, wall color correction, and multiplication is performed by the multiplier 303. However, the present invention is not limited to this, and another method may be used alternatively, such as a method which adjusts the gains after matching black levels of each color using offset values.

Next, in step S406, the image projection apparatus 100 sends the gains Ar, Ag, and Ab computed in step S405 to the multiplier 303. At the same time, the pattern generation circuit 301 generates an all-gray pattern (a second image) which is a pattern for sensing of the illuminating light 204 and projects the pattern onto the screen 201. The reason why a gray image is projected instead of a white image is to accurately sense the illuminating light 204 reflected by the screen 201 by reducing the effect of the light source in the illumination optical system 106. Also, at this time, wall color correction is applied to the projected image using the gains Ar, Ag, and Ab to eliminate the effect of the coloring of the screen 201. Next, in step S407, the image projection apparatus 100 acquires color data Re, Ge, and Be of the screen 201 subjected to wall color correction, from the R sensor 116, G sensor 117, and B sensor 118, respectively. Incidentally, although an all-gray image is projected in the example described above, another color may be used partially, or a color other than gray may be used as long as the color contains each of R, G, and B components.

Next, in step S408, the image projection apparatus 100 substitutes the color data Re, Ge, and Be acquired in step S407 into Eqs. (1) and (2) and thereby computes chromaticity of the illuminating light 204.

$$r = Re/(Re+Ge+Be) \quad \text{Expression (1)}$$

$$g = Ge/(Re+Ge+Be) \quad \text{Expression (2)}$$

An example of the chromaticity computed here is shown in 810 of FIG. 8B.

Next, in step S409, the image projection apparatus 100 estimates the illuminating light 204 based on the chromaticity computed in step S408. The ROM 111 prestores center values of rg chromaticity and major-component information for use to determine likelihood of 15 types of standard light source—F1 to F12 (fluorescent lamps), A (white light source), D50 (5000K), and D65 (daylight). The CPU 112 reads the data for likelihood determination. Incidentally, although 15 types of standard light source are used in the present embodiment, naturally more than or less than 15 types of standard light source may be used.

Figure 9A:
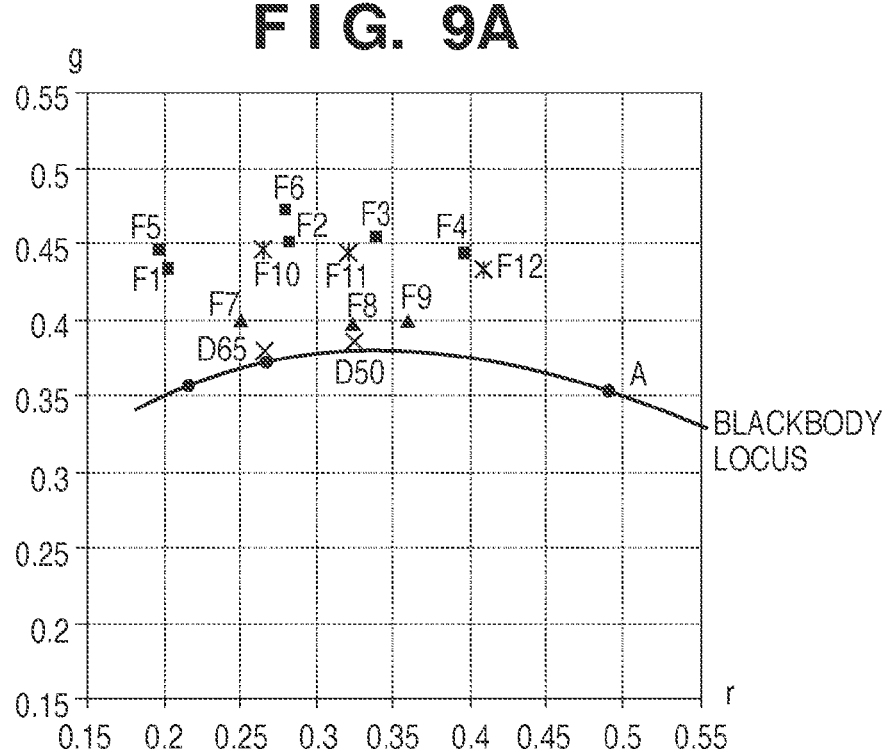
FIG. 9A is a diagram describing a distribution of center values of standard light sources in terms of rg chromaticity.

FIG. 9A is a diagram describing a distribution of center values of standard light sources in terms of rg chromaticity prestored in the ROM 111.

Figure 9B:
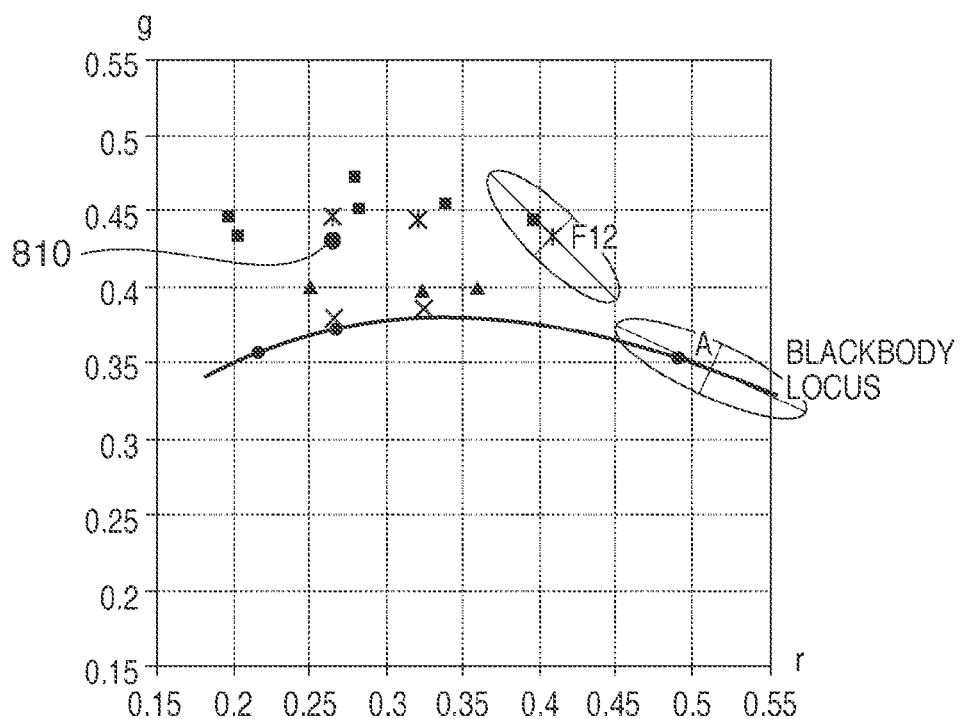
FIG. 9B is a diagram describing major-component information about an A light source and F12 light source.

FIG. 9B is a diagram describing major-component information about the A light source and F12 light source as an example of major-component information. In FIG. 9B, two axes intersecting at right angles at each center value represent major components and an ellipse corresponds to a locus which represents a predetermined likelihood. The CPU 112 determines likelihood for all the 15 types of standard light source based on the chromaticity of the illuminating light 204 computed in step S408 and determines the light source with the highest likelihood as being the type of the illuminating light. For example, if the chromaticity of the illuminating light computed in step S408 corresponds to the chromaticity represented by 810 in FIG. 8B and FIG. 9B, the type of the illuminating light is estimated to be the light source F10.

Next, in step S410, based on the type of the illuminating light determined in step S409, the image projection apparatus 100 performs calculations for second color correction in order for the LUT calculation unit 114 to generate a 3D-LUT containing color correction information for ambient light correction. The process of creating the three-dimensional lookup table 3D-LUT in step S410 is performed according to a flowchart in FIG. 5.

Figure 5:
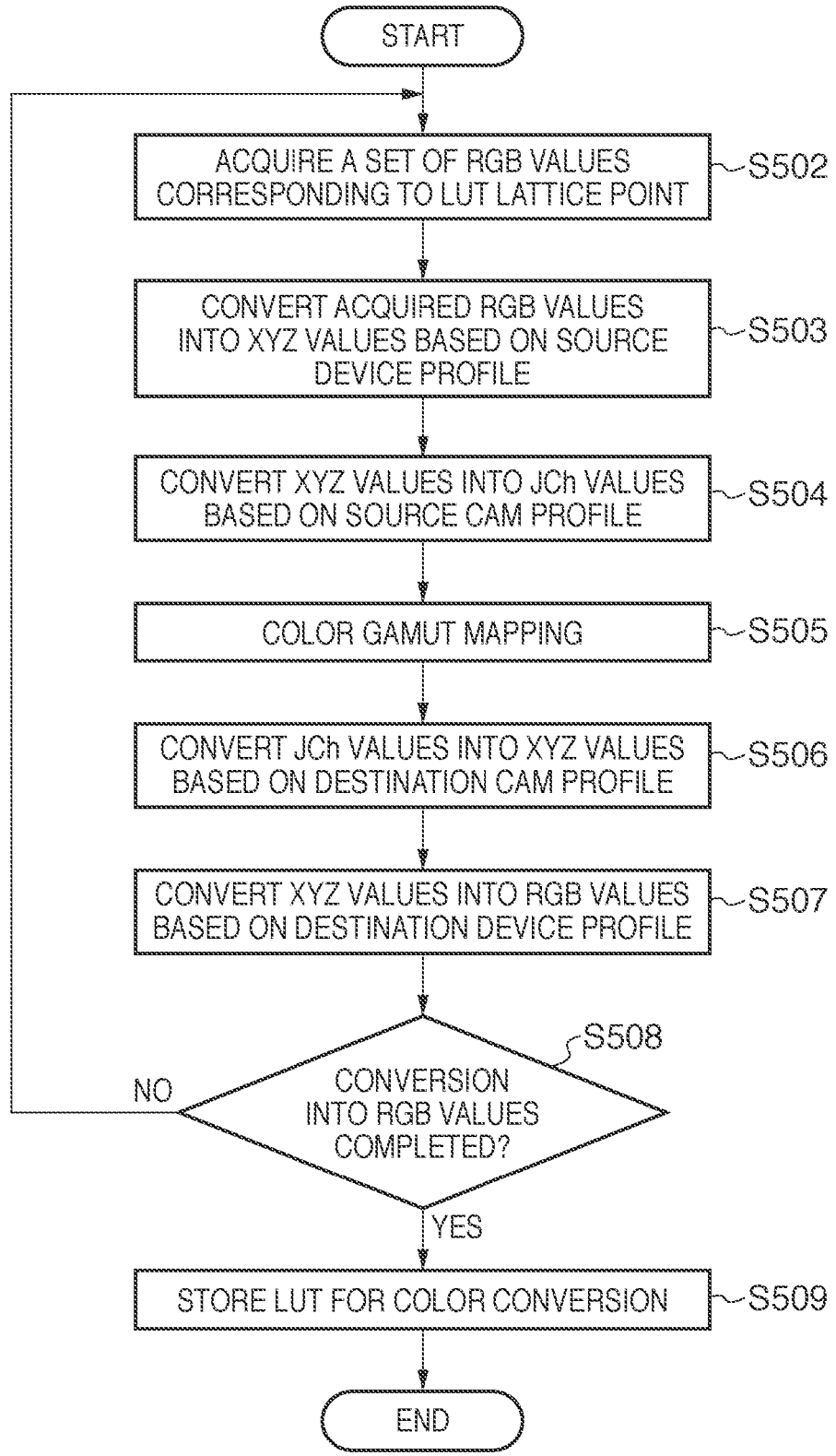
FIG. 5 is a flowchart describing a process performed by an LUT calculation unit according to the first embodiment.

FIG. 5 is a flowchart describing a process performed by the LUT calculation unit 114 according to the first embodiment. The process is performed by the LUT calculation unit 114 on instructions from the CPU 112. Prior to this process, 16 kinds of profiles are prepared as destination profiles and stored in the ROM 111 by measuring screen colors under lighting conditions of F1 to F12, A, D50, and D65 as well as under a non-lighting condition.

First, in step S502, the LUT calculation unit 114 acquires a set of RGB values corresponding to an LUT lattice point. Next, in step S503, the LUT calculation unit 114 converts the acquired RGB values into XYZ values based on a source device model. The source device model may be one of various models including sRGB and AdobeRGB. Although sRGB is used as an example of the source device model in the first embodiment, the present invention is not limited to this.

Next, in step S504, the LUT calculation unit 114 converts the XYZ values computed in step S503 into JCh values based on CIECAM02 published by the Commission Internationale de l'Eclairage (CIE; or the International Lighting Commission). Next, in step S505, based on a source color gamut and destination color gamut, the LUT calculation unit 114 does color gamut mapping so as to map colors outside the destination color gamut to a destination color gamut surface with the shortest distance without converting colors in the destination color gamut. The source color gamut and destination color gamut are computed in advance before this process. Next, in step S506, the LUT calculation unit 114 converts the JCh values computed in step S504 into XYZ values based on CIECAM02. Next, in step S507, the LUT calculation unit 114 converts the XYZ values computed in step S506 into RGB values based on a destination device model. Incidentally, the destination profile used in step S507 is selected from the 16 kinds of profiles described above. In S508, the LUT calculation unit 114 determines whether conversion into RGB values has been completed at all LUT lattice points. If computations of RGB values have been completed, the LUT calculation unit 114 advances the process to step S509. Otherwise, the process returns to step S502. In step S509, the LUT calculation unit 114 stores the 3D-LUT for conversion in the table storage unit 110, and finishes processing.

Once the processing is finished, the image projection apparatus according to the present embodiment is ready to project an image obtained by applying ambient light correction and wall color correction to the inputted image data.

Figure 6:
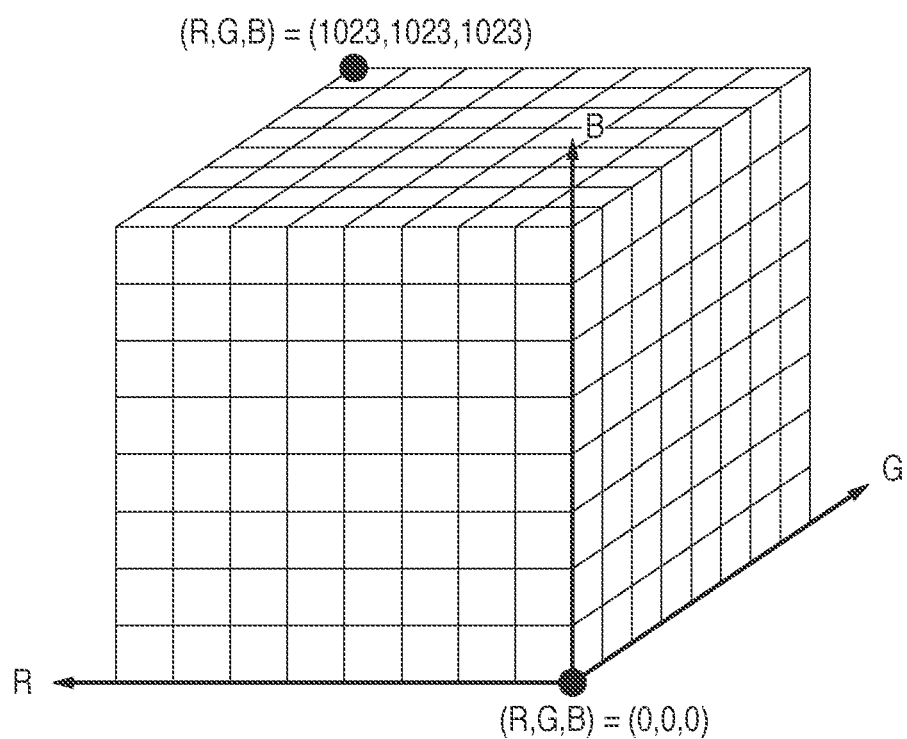
FIG. 6 is a diagram describing a 3D-LUT for color correction according to the first embodiment.

FIG. 6 is a diagram describing a 3D-LUT for color correction according to the first embodiment.

Specifically, FIG. 6 shows combinations of color coordinate data of lattice points in an RGB color space and RGB values which are lattice point data associated with RGB coordinate values of the lattice points. Although FIG. 6 shows an example in which RGB data is 10 bits and lattice points are located at points obtained by dividing each of the R, G, and B axes into eight equal parts, the bit count of signals and the number of lattice points are not limited to these.

In the flowchart in FIG. 5, each of the lattice points (R,G, B)=(0, 0, 0) to (R,G,B)=(1023, 1023, 1023) is subjected to the processes of steps S502 to S507 to generate a 3D-LUT for ambient light correction. Post-conversion RGB values other than those of the lattice points are generated by an interpolation process.

In the first embodiment, the LUT calculation unit 114 is provided to generate a 3D-LUT on a hardware basis on instructions from the CPU 112 as an example. However, the method for generating a 3D-LUT is not limited to this, and the CPU 112 may generate a 3D-LUT through calculations according to software instead of using the LUT calculation unit 114. Anyway, there is no difference between hardware and software in that the image projection apparatus operates according to the flowcharts in FIGS. 4 and 5.

In the first embodiment, the LUT calculation unit 114 generates the 3D-LUT for ambient light correction based on the type of illuminating light determined. However, the present invention is not limited to this, and 3D-LUTs for each type of illuminating light may be prestored in the ROM 111 to allow selection of the 3D-LUT corresponding to the illuminating light determined in step S410 in FIG. 4.

As described above, according to the first embodiment, the image projection apparatus first senses the color of the projection plane using a sensor, then performs screen color correction (wall color correction), does a projection, senses the color of the projection plane using a sensor again in this state, and estimates illuminating light (ambient light). This makes it possible to estimate the illuminating light accurately even if the screen is colored and furthermore to accurately generate a 3D-LUT for illuminating light correction based on the estimated illuminating light.

Also, in generating the 3D-LUT, since it is only necessary to create a table which is used only for correction for illuminating light and which does not have a wall color correction function, it is possible to reduce calculation time. Furthermore, even if the type or state of illuminating light changes during projection, since the wall color correction has been completed in the previous state of the illuminating light, a 3D-LUT for illuminating light correction can be generated accurately by estimating the illuminating light quickly.

A second embodiment of the present invention will be now described with reference to FIG. 7. The image projection apparatus according to the second embodiment has the same configuration (FIG. 1) as the image projection apparatus according to the first embodiment, and thus description thereof will be omitted. The difference is that whereas gain adjustment is used for wall color correction in the first embodiment described above, a one-dimensional lookup table (1D-LUT) is used for wall color correction in the second embodiment. To generate the 1D-LUT, a basic 1D-LUT may be stored in the ROM 111, and changes in characteristics may be made by the LUT calculation unit 114 as a result of wall color correction and stored in the table storage unit 110. Alternatively, the 1D-LUT may be generated from scratch by the LUT calculation unit 114 and sent to the table storage unit 110. Then, the 1D-LUT is stored in a different area of the table storage unit 110 from the 3D-LUT for ambient light correction.

The generation or change of the 1D-LUT is done in step S405 of the flowchart in FIG. 4. Here, a ratio of R, G, and B of 1D-LUT output values is set to be R0:G0:B0. Normally, the 1D-LUT is used for gamma correction. The gamma correction may be replaced by the VT gamma correction performed by the display device driving circuit 105 according to the first embodiment described above or may be performed using $\gamma=2.2$.

Figure 7:
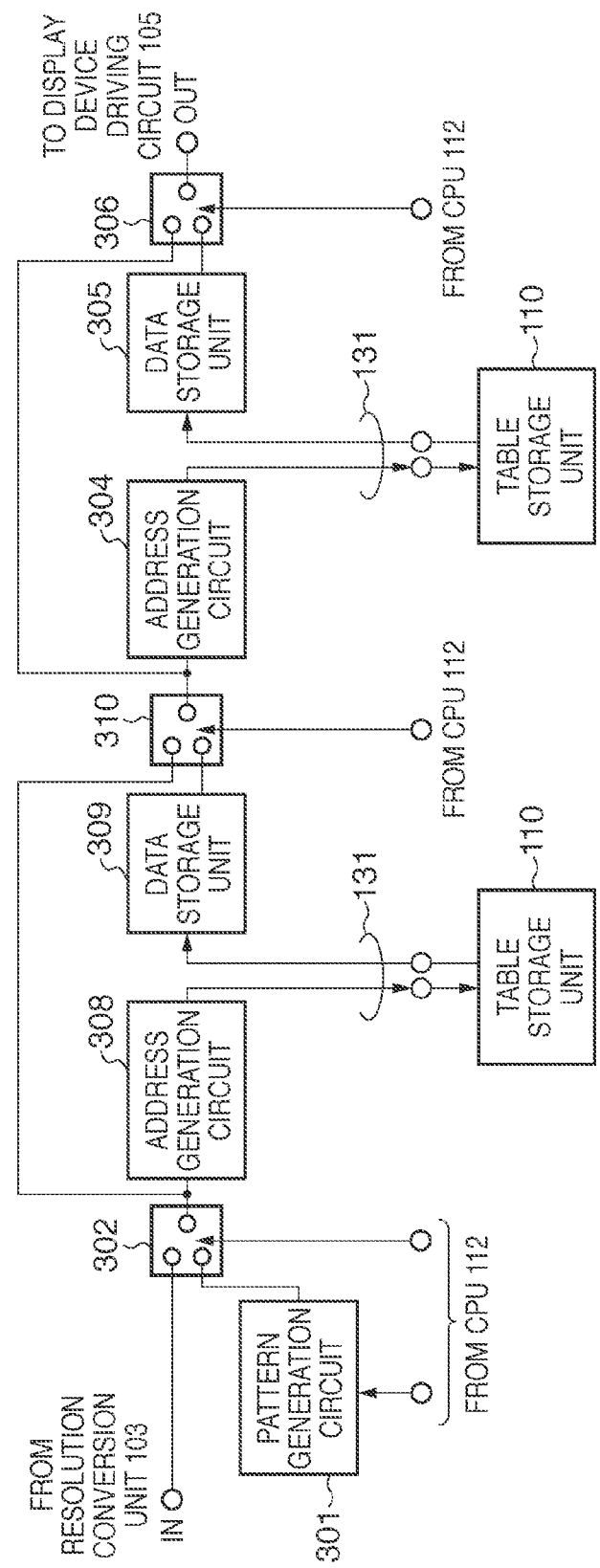
FIG. 7 is a block diagram describing a configuration of a color correction circuit according to a second embodiment.

FIG. 7 is a block diagram describing a configuration of a color correction circuit 104 according to the second embodiment.

Output of the resolution conversion unit 103 is inputted in the selector 302. Output of a pattern generation circuit 301 which generates a calibration pattern for use to sense the projection plane is also inputted in the selector 302. On instructions from the CPU 112, the selector 302 selects the output of the pattern generation circuit 301 when a calibration pattern for color measurement of the screen 201 is used, and selects the output of the resolution conversion unit 103 when a normal image is projected. Output of the selector 302 is sent to a selector 310 and an address generation circuit 308. The address generation circuit 308 converts an output signal of the selector 302 into an address in the table storage unit 110 and sends the address to the table storage unit 110 via the data bus 131. The table storage unit 110 reads data out of the inputted address and sends the data to a data storage unit 309 via the data bus 131. The data storage unit 309 extracts a signal value from the data received from the table storage unit 110 and sends the signal value to the selector 310, where the signal value corresponds to a value obtained by applying predetermined correction to the output signal of the selector 302. The address generation circuit 308 and data storage unit 309 exchange addresses and data related to the 1D-LUT. On instructions from the CPU 112, the selector 310 selects the output signal of the data storage unit 309 when wall color correction is performed using the 1D-LUT, and selects the output signal of the selector 302 when the wall color correction is not performed using the 1D-LUT.

Output of the selector 310 is sent to a selector 306 and an address generation circuit 304. The address generation circuit 304 converts an output signal of the selector 310 into an address in the table storage unit 110 and sends the address to the table storage unit 110 via the data bus 131. The table storage unit 110 reads data out of the inputted address and sends the data to the data storage unit 305 via the data bus 131. The data storage unit 305 extracts a signal value from the data received from the table storage unit 110 and sends the signal value to the selector 306, where the signal value corresponds to a value obtained by applying predetermined correction to the output signal of the selector 310. The address generation circuit 304 and a data storage unit 305 exchange addresses and data related to the 3D-LUT. On instructions from the CPU 112, the selector 306 selects the output of the data storage unit 305 when ambient light correction is performed using the 3D-LUT, and selects the output signal of the selector 310 when ambient light correction is not performed.

As described above, according to the second embodiment, the image projection apparatus first senses the color of the projection plane using a sensor, then performs screen color correction (wall color correction) using a 1D-LUT, does a projection, senses the color of the projection plane using the sensor again in this state, and thereby estimates illuminating light (ambient light). This makes it possible to estimate the illuminating light accurately even if the screen is colored and furthermore to accurately generate a 3D-LUT for illuminating light correction based on the estimated illuminating light.

Also, in generating the 3D-LUT, since it is only necessary to create a table which is used only for illuminating light correction and which does not have a wall color correction function, it is possible to reduce calculation time. Furthermore, even if the type or brightness of illuminating light changes during projection, since wall color correction has been completed in the previous state of the illuminating light, a 3D-LUT for illuminating light correction can be generated accurately by estimating the illuminating light quickly.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157313, filed Jul. 1, 2009, which is hereby incorporated by reference herein in its entirety.

What is claimed is:

1. An image projection apparatus comprising:
an obtain unit that obtains image data;
a first correction unit, that corrects the image data obtained by the obtain unit;
a second correction unit that corrects the image data corrected by the first correction unit;
an image projection unit that projects an image <on a projection plane based on image data;
a sensor that senses a color on the projection plane; and
a controller;
wherein the controller controls the image projection unit to project a white color image on the projection plane, wherein the white color image is not corrected by the first correction unit and the second correction unit, and controls to cause the sensor to perform a first sensing in which the sensor senses the projection plane on which the white color image is projected,
wherein the controller computes a gain of the first correction unit based on both data of the white color image sensed in the first sensing and an ideal white color value of the white color image,
wherein he controller controls to cause the first correction unit to correct a gray color image by using the gain, controls the image projection unit to project the gray color image corrected by the first correction unit on the projection plane, and controls to cause the sensor to perform a second sensing in which the sensor senses the projection plane on which the gray color image is projected,
wherein the controller computes a chromaticity based on a sensed result of the second sensing,
wherein the controller estimates a type of light source in an environment in which the image projection apparatus is located, based on the chromaticity, and
wherein the controller determines a correction table for correcting RGB values of image data input in the second correction unit in accordance with the type of the light source.

2. The image projection, apparatus according to claim 1, wherein the first correction unit corrects the image data by using a one-dimensional lookup table.

3. The image projection apparatus according to claim , wherein the second correction unit corrects the image by using a one-dimensional lookup table.

4. The image projection apparatus according to claim 1, wherein the controller controls the first correction unit to correct the gray color image by using a gamma correction, wherein the gamma correction being for approximating RGB values of the first sensing to RGB values of the white color image.

5. The image projection apparatus according to claim 1, wherein the controller controls the first correction unit to correct the gray color image by using a gain adjustment, wherein the gain adjustment being for approximating RGB values of the first sensing to RGB values of the white color image.

6. The image projection apparatus according to claim 1, wherein the controller controls the first correction unit to correct the image, data obtained by the obtain unit, controls the second correction unit to correct the image data corrected by the first correction unit, and controls the projection unit to project the image data corrected by the second correction unit.

7. A method of controlling an image projection apparatus which includes an image projection unit and an image sensing unit, comprising:
an obtain step of obtaining image data;
a first correction step of correcting the image data obtained in the obtain step;
a second correction step of correcting the image data corrected in the first correction step;
an image projection step of projecting an image on a projection plane based on image data;
a sensing step of causing a sensor to sense a color on the projection plane; and
a control step of controlling:
(i) to project a white color image on the projection plane, wherein the white color image is not corrected in the first correction step and the second correction step, and to perform a first sensing in which the sensor senses the projection plane on which the white color image is projected, (ii) to compute a gain of the first correction step based on both data of the white color image sensed in the first sensing and an ideal white color value of the white color image, (iii) to cause the first correction step to correct a gray color image by using the gain, project the gray color image corrected in the first correction step on the projection plane, and to cause the sensor to perform a second sensing in which the sensor senses he projection plane on which the gray color image is projected, (iv) to compute a chromaticity based on a sensed result of the second sensing, (v) to estimate a type of light source in an environment in which the image projection apparatus is located, based on the chromaticity, and (vi) to determine a correction table for correcting RGB values of image data input in the second correction step in accordance with the type of the light source.

8. An image projection apparatus comprising:
an obtain unit that obtains image data;
a first correction unit that corrects the image data obtained by the obtain unit;
a second correction unit that corrects the image data corrected by the first correction unit;
an image projection unit that projects an image on, a projection plane based on image data;
a sensor that senses a color on the projection plane; and
a controller;
wherein the controller controls the image projection unit to project a white color image, wherein the white color image is not corrected by the first correction unit and the second correction unit, controls the sensor to sense color on the projection plane during projecting the white color image on the projection plane, and obtains first correction information in accordance with the sensed color on the projection plane and an ideal white color value of the white color image,
wherein after obtaining the first correction information the controller controls the first correction unit to correct a gray color image, based on the first correction information, controls the image projection unit to project the gray color image corrected by the first correction unit on the projection plane, controls the sensor to sense color on the projection plane during projecting the gray color image, estimates a type of light source in an environment in which the image projection apparatus is located, based on a chromaticity of the sensed color on the projection plane, and obtains second correction information in accordance with the type of light source in an environment in which the image projection apparatus is located, and
wherein the controller corrects the image data based on the first correction information and the second correction information and causes the image projection unit to project the corrected image.

9. An image projection apparatus comprising:
an image projection unit that projects an image on a projection plane based on image data;
an image sensing unit that senses color on the projection plane;
a wall color correction unit;
an ambient light correction unit; and
a controller,
wherein he controller controls the image projection unit to project a white color image for a wall color correction, wherein the white color image is not corrected by the wall color correction unit and the ambient light correction unit, and obtains wall color correction information based on sensed results produced by the image sensing unit when the white color image is projected and an ideal white color value of the white color image, and
wherein the controller controls the projection unit to project a gray color image for an ambient light correction, wherein the gray color image data is corrected based on the wall color correction information by the wall color correction unit, estimates a type of ambient light based on a chromaticity of the sensed results on the projection plane, and obtains ambient light correction information based on the estimated type of ambient light.

10. The image projection apparatus according to claim 9, wherein the wall color correction information is stored as a one-dimensional lookup table.

11. The image projection apparatus according to claim 9, wherein the ambient light correction information is stored as a three-dimensional lookup table.

12. The image projection apparatus according to claim 9, wherein the controller computes the wall color correction information such that a ratio of Rw, Gw, and Bw of the sensed results will approach a ratio of R0, G0, and B0 of the ideal white color value.

13. A method of controlling an image projection apparatus having an image projection unit for projecting an image on a projection plane, an image sensing unit for detecting a color of the projection plane, a wall color correction unit, and an ambient light correction unit, comprising:
a control step of:
(i) controlling the image projection unit to project a white color image for a wall color correction, wherein the white color image is not corrected by the wall color correction unit and the ambient light correction unit, and obtaining wall color correction information based on sensed results produced by the image sensing unit when the white color image is projected and an idea white color value of the white color image,
(ii) controlling the projection unit to project a gray color image for an ambient light correction, wherein the gray color image is corrected based on the wall color correction information by the wall color correction unit, estimating a type of ambient light based on a chromaticity of the sensed results on the projection plane, and obtaining ambient light correction information based on the estimated type of ambient light.

* * * * *